United States Patent [19]  [11]  4,198,325
Hammer et al.  [45]  Apr. 15, 1980

[54] SHAPED ARTICLE COMPRISING A PERMANENTLY PLASTICIZED CELLULOSE COMPOSITION AND PREPARATION THEREOF

[75] Inventors: Klaus-Dieter Hammer, Mainz; Günter Gerigk, Oberursel, both of Fed. Rep. of Germany

[73] Assignee: Hoechst Aktiengesellschaft, Frankfurt am Main, Fed. Rep. of Germany

[21] Appl. No.: 856,033

[22] Filed: Nov. 30, 1977

[30] Foreign Application Priority Data

Dec. 1, 1976 [DE] Fed. Rep. of Germany ....... 2654417

[51] Int. Cl.$^2$ .............................................. C08L 1/02
[52] U.S. Cl. ................................. 260/17.3; 264/195; 426/105; 426/138; 428/36
[58] Field of Search ......................................... 260/17.3

[56] References Cited

U.S. PATENT DOCUMENTS

| | | | |
|---|---|---|---|
| 2,273,636 | 2/1942 | Gellendien et al. | 264/342 |
| 3,211,730 | 10/1965 | Orthner et al. | 544/220 |
| 4,002,712 | 1/1977 | Hammer et al. | 264/194 |
| 4,097,963 | 7/1978 | Hammer et al. | 428/36 |

FOREIGN PATENT DOCUMENTS

| | | | |
|---|---|---|---|
| 1414073 | 9/1965 | France | 264/194 |
| 2200282 | 4/1974 | France | 264/194 |
| 1044306 | 9/1966 | United Kingdom | 264/194 |
| 1201830 | 8/1970 | United Kingdom | 264/194 |
| 1259666 | 1/1972 | United Kingdom | 264/194 |
| 1417419 | 12/1975 | United Kingdom | 264/194 |
| 1493367 | 11/1977 | United Kingdom | 264/194 |

*Primary Examiner*—Edward M. Woodberry
*Attorney, Agent, or Firm*—Schwartz, Jeffery, Schwaab, Mack, Blumenthal & Koch

[57] ABSTRACT

A shaped article, especially a tubing, is disclosed which comprises a plasticized cellulose hydrate composition of high mechanical strength which is obtained by treating a plasticized cellulose composition obtained by treating cellulose hydrate with a plasticity-enhancing amount of at least one plasticizing alkyl-derivative which comprises an alkyl containing from about 8 to about 24 carbon atoms and which is selected from the group consisting of alkylamido-bis-dimethylene-triazinone-tetra-methylol, alkylamino-bis-dimethylene-triazinone-tetra-methylol and a substantially water insoluble ester of an aliphatic monocarboxylic acid containing from about 9 to about 25 carbon atoms and a polyalcohol, such as glycerol or polyethylene glycol, with a synthetic polymer containing recurring oxyalkylene units and at least one, preferably at least two, terminal N-methylolcarbamate groups, and water and/or plasticizer.

Such shaped articles can be prepared by mixing a viscose solution with a liquid containing the plasticizing alkyl derivative, introducing the resulting mixture into a precipitating bath, washing the precipitated shaped body in the gel state, treating it with an acidic solution of the synthetic polymer and drying it in the heat. Tube shaped articles are especially suited as sausage casings.

50 Claims, No Drawings

SHAPED ARTICLE COMPRISING A PERMANENTLY PLASTICIZED CELLULOSE COMPOSITION AND PREPARATION THEREOF

BACKGROUND OF THE INVENTION

The invention relates to shaped articles, in particular packaging material, preferably tubing, comprising a plasticized cellulose composition, water and, if appropriate, a secondary plasticizer. In particular, the invention relates to such a shaped article in the form of a tubing, which further comprises a reinforcement of fibrous material, in particular a nonwoven fleece, preferably a nonwoven fleece of long-fibered paper, incorporated in its wall.

The invention also relates to the use of tubing according to the invention as a packaging material, e.g., a packaging material adapted for food packaging, in particular as an artificial sausage casing. Artificial sausage casings of this type are not intended for human consumption.

Furthermore, the invention comprises a process for preparing the shaped articles according to the invention.

Shaped articles of cellulose hydrate, in particular packaging material, can be readily disposed of after use by burning them, and they have the further advantage that they undergo bacterial decomposition relatively rapidly.

A further advantageous characteristic of shaped articles of this type is that such a cellulose hydrate packaging material changes its properties while it is in use. This property is particularly important in the case of sausage casing, since it is necessary that the sausage casing always adapts itself to the shrinking sausage material so that the resulting sausages are always well filled and of attractive appearance.

Tubular casings of synthetic polymers, such as polyamide, polyester, polyvinylidene chloride of the like, do not show this advantageous behavior to the required degree, due to their inert properties.

For this reason, sausages with casings of the above polymers frequently become wrinkled and unattractive in an undesired manner and thus unsaleable.

The properties and the structure of the cellulose hydrate forming the shaped articles can be varied within wide limits by means of the properties and the composition of the starting viscose solution, the average degree of polymerization, the spinning conditions and drying conditions during the manufacture of the shaped articles and the plasticizer content thereof.

It has also been proposed to improve the suppleness of plasticizer-free cellulose hydrate by adding fat-like chemical substances which are capable of crosslinking. Hitherto, however, it has not been possible to completely prevent, or to even adequately limit, the very extensive changes of structure and properties which for example occur in plasticized shaped cellulose hydrate articles, when these shaped articles largely lose their content of plasticizer as a result of contact with water and/or drying.

In case of synthetic water vapor impermeable sausage casings which are made of a cellulose hydrate which has been plasticized by means of a secondary chemical plasticizer and which are coated on their inside with a polymer film, extensive shrinkage of the skin occurs after removal or loss of the secondary plasticizer. Such a removal of the secondary plasticizer from the casing material is unavoidable during the manufacture of sausages. This shrinkage leads to a high internal pressure coupled with a simultaneous embrittlement of the cellulose hydrate so that there is a risk that these skins, in most cases, will tear over the entire length of the skin when the sausages are cut open.

If the tearing of the skins is prevented by previously moistening or cooling the sausage skins, a considerable part of the sausage material is pressed out through the cut surface in an undesirable manner as a result of the high internal pressure.

Since the prior art sausage casings become embrittled due to the loss of plasticizer, sausages of this type, that is their skin, are sensitive to shocks in transit.

The above mentioned undesirable properties of sausage skins of cellulose hydrate also cannot be prevented by using skins which contain a portion of fat-like crosslinking agents.

SUMMARY OF THE INVENTION

It is an object of the present invention to provide permanently plasticized chemically modified cellulose materials of high strength, in particular, films, which are useful as packaging material, e.g., for food, especially tubings which are useful as sausage casings and wherein the disadvantages of the prior art cellulose hydrate materials are avoided.

It is a further object of the present invention to provide such permanently plasticized cellulose material, especially for use as a sausage casing, which exhibits a high mechanical strength, yet wherein the occurrance of adverse changes of properties, in particular an embrittlement, are excluded and which retains a satisfactory suppleness for its intended use, even after any secondary plasticizer has been completely removed thereform, e.g. during a sausage manufacturing process.

It is a further object of the present invention to provide shaped aricles, in particular tubing, comprising such a permanently plasticized cellulose of high mechanical strength, in particular tear strength and tensile strength, especially a tubing having such a high mechanical strength, that even after treatment with hot water or superheated steam, a sufficiently strong sausage causing is obtained.

It is another object of the present invention to provide a permanently plasticized cellulose hydrate material which is sufficiently supple and exhibits an appropriate degree of shrinkage to provide a sausage casing which permits the preparation of sausages which can easily be transported and stored and which can readily be cut without tearing of their casings.

It is still a further object of the present invention to provide a permanently plasticized cellulose material of high strength which is preferably suited for preparing sausage casings which comprise an inside coating of a moisture impermeable polymer and optionally a fibrous reinforcement, in particular, a permanently plasticized cellulose material of high strength which improves the properties and behavior of such sausage casings with respect to the shirring procedure to which sausage casings are usually submitted, and which has an appropriate shrinkability to readily adjust to the shrinkage of its content.

It is still a further object of the present invention to provide such a permanently plasticized cellulose material containing packaging material, e.g., a sausage casing, wherein the desirable properties of cellulose hydrate, in particular, its favorable behavior in contact with water, are retained, but which at the same time exhibit the desirable properties of packaging materials, which are made from synthetic polymers.

It is yet a further object of the present invention to provide a process for preparing shaped articles of permanently plasticized cellulose material of high strength, by which the disadvantages of the prior art processes are avoided.

Yet another object of the present invention is to provide such a process by means of which it is possible to manufacture shaped articles, in particular tubing, comprising a permanently plasticized cellulose material of high strength which, on the one hand is crosslinked to an adequate extent uniformly throughout its cross-section and at the same time is characterized by permanent softness by using a conventional manufacturing procedure, without applying additional process steps and without substantially modifying the customary and proven course of manufacture.

In order to accomplish the foregoing objects according to the present invention, there are provided shaped articles, especially films or tubes, which are adapted for packaging food, which include plasticized chemically modified cellulose compositions of high mechanical strength which comprise (a) a plasticized cellulose composition obtained by treating cellulose hydrate with a plasticity enhancing amount of at least one plasticizing alkyl derivative which comprises at least one alkyl containing from about 8 to about 24 carbon atoms and which is selected from the group consisting of alkylamido- bis-di-methylene-triazinone-tetramethylol, alkyl-amino-bis-dimethylene-triazinone-tetramethylol, a substantially water insoluble ester of an aliphatic monocarboxylic acid containing from about 9 to about 25 carbon atoms, and a polyalcohol comprising at least two hydroxy groups at least one of which is esterified with said aliphatic monocarboxylic acid, and mixtures thereof, (b) incorporated therein at least one synthetic polymer containing recurring oxyalkylene groups and at least one, preferably at least two, terminal N-methylol carbamate groups having the formula $$-CH_2-O-CO-NH-CH_2-OH$$ and (c) water.

Optionally, the above shaped articles may further comprise a secondary chemical plasticizer.

Preferred synthetic polymers are homo- or copolymers of ethylene oxide or propylene oxide. If the shaped article is a tubing, adapted for use as a sausage casing, it may further comprise a reinforcement of a fibrous non-woven material.

According to the present invention, there is further provided a process for preparing the above described shaped articles which comprises the steps of:

(a) mixing a viscose containing solution and a liquid comprising at least one plasticizing alkyl derivative which comprises at least one alkyl group containing from about 8 to about 24 carbon atoms and which is selected from the groups consisting of alkylamido-bis-dimethylene-triazinone-tetramethylol, alkyl-amino-bis-dimethylene-triazinone-tetramethylol, a substantially water insoluble plasticizing ester of an aliphatic monocarboxylic acid containing from about 9 to about 25 carbon atoms, and a polyalcohol comprising at least two hydroxy groups, at least one of which is esterified with said aliphatic monocarboxylic acid, and mixtures thereof, to form a liquid mixture;

(b) introducing the liquid mixture through the shaping orifice of a die into a precipitating liquid to precipitate a shaped body comprising the hydrated cellulose in a gel state and a plasticity-enhancing amount of said plasticizing alkyl derivative;

(c) washing the precipitated shaped body in the gel state;

(d) treating the washed shaped body in the gel state with an acidic aqueous solution containing at least one synthetic polymer containing recurring oxyalkylene groups, in particular a polyoxyalkylene, and containing at least one, preferably at least two, terminal N-methylol carbamate groups having the formula $$-CH_2-O-CO-NH-CH_2-OH$$

to incorporate into the shaped body, a sufficient amount of the synthetic polymer to enhance the mechanical strength of the resulting shaped article; and, (e) heat treating the treated shaped body to obtain a dried shaped article comprising the plasticized chemically modified cellulose composition of high mechanical strength.

The water content of the shaped article may be further adjusted to provide a desired degree of suppleness thereto, e.g., by moistening with water.

The tube-shaped articles according to the present invention are particularly useful as sausage casings. Accordingly, there is further provided according to the present invention a process for preparing sausages which comprise the step of filling the sausage material into an above described tube-shaped article.

Further objects, features and advantages of the present invention will become apparent from the detailed description of the invention and its preferred embodiments which follows.

DETAILED DESCRIPTION OF THE INVENTION

In the shaped articles according to the present invention, the synthetic polymer is bonded to the cellulose hydrate through a chemical bond which is formed by a chemical reaction between the hydroxy groups of the cellulose hydrate and the reactive groups of the synthetic polymer. This reaction takes place at least partially during the treating step (d) of the process according to the present invention, is continued and at least largely completed during the heat treatment and may be finally completed during the later storage or use of the article.

The term "incorporate" within the process step (d) accordingly comprises impregnating the gel with the synthetic polymer, bonding it to the cellulose hydrate by intermolecular forces and forming and effecting at least partial chemical reaction between the cellulose derivative and the synthetic polymer.

Preferably the plasticizing alkyl derivative in the cellulose composition comprises at least one alkyl having from about 9 to about 21, preferably from about 15 to about 19, and most preferably about 17 carbon atoms.

Preferably the cellulose composition comprises from about 60 to about 99.5% by weight, of cellulose hydrate and from about 0.5 to about 40% by weight, of the above defined plasticizing alkyl derivative. The percentage by weight always refers to the solids content of the composition.

According to one embodiment of the invention, the total quantity of the plasticizing alkyl derivative which is contained in the solid composition and is capable of permanently plasticizing cellulose hydrate is substantially provided by at least one of said esters which is capable of permanently plasticizing cellulose hydrate and which is an ester of an aliphatic monocarboxylic acid, having preferably from about 9 to about 21 carbon atoms and a poly-alcohol containing at least two alcoholic groups in the molecule, at least one of which is esterified with said acid or a mixture, of different, permanently plasticizing esters of this type.

According to another embodiment of the invention, the plasticizing alkyl derivative is substantially comprised of at least one alkyl derivative which contains preferably four methylol groups and at least one alkyl group having preferably from about 9 to about 21, most preferably from about 15 to about 19 and in particular about 17 carbon atoms as are described in the Belgian Pat. No. 823,410, the disclosure of which is hereby incorporated by reference, or a mixture of different methylol group containing alkyl derivatives of this type. In particular these methylol group containing alkyl derivatives are alkylamino- or alkylamido-bis-dimethylene-triazinone-tetramethylols, preferably stearylamino- or stearylamido-bis-dimethylene-triazinone-tetramethylol. According to another embodiment of the invention the plasticizing alkyl derivative comprises mixtures of the permanently plasticizing above mentioned esters and the above mentioned permanently plasticizing alkyl derivatives which have methylol groups and at least one long-chain alkyl in the molecule.

The permanently plasticizing ester is an ester of an aliphatic, preferably saturated, monocarboxylic acid containing from about 9 to about 25, preferably about 15 to 18, and most preferably 17 carbon atoms, and an aliphatic alcohol having at least two, preferably primary, alcoholic hydroxy groups, at least one of which is esterified with said acid, or mixtures of esters of this type.

Among the aliphatic monocarboxylic acids, saturated acids are preferred. Yet, mono-unsaturated and polyunsaturated fatty acids, for example, oleic acid, linoleic acid, or linolenic acid, are also suitable as an acid component in the ester.

The esters may comprise only one type of acid component per molecule, or may comprise two or more different acid components per molecule. Thus, the unsaturated fatty acid can preferably be present as an additional acid component in the ester molecule, in addition to one of the above-mentioned saturated fatty acids.

In addition to the OH-groups which are esterified with the above-defined monocarboxylic acids, further hydroxy groups of the alcohol component within suitable permanently plasticizing esters may be esterified with a, preferably, aliphatic carboxylic acid, which contains at least one further functional group which is a hydroxy group or a carboxyl group, for example, a di- or tri-carboxylic acid or a hydroxycarboxylic acid containing one to three carboxyl groups. Aliphatic hydroxycarboxylic acids are preferred.

In particular, such aliphatic carboxylic acids containing from 2 to about 8 carbon atoms in their molecule chain are suitable; aliphatic hydroxycarboxylic acids, in particular, lactic acid or citric acid, are most preferred.

An example of a suitable aromatic hydroxycarboxylic acid is salicylic acid.

Preferably, the plasticing esters are esters of at least one aliphatic monocarboxylic acid containing at least about 14, preferably from about 14 to about 20, most preferably about 17, carbon atoms, and preferably an aliphatic alcohol which contains at least two, preferably primary OH-groups. Among thest alcohols, the following are particularly preferred: lower alkyl polyols containing 2 to about 6 carbon atoms and 2 to about 6 hydroxy groups, such as:

(1) lower alkyl diols, e.g. ethanediol, propanediol, butanediol, and lower alkyl tri- or tetraols, e.g. glycerol and pentaerythritol;

(2) lower alkyl penta- and hexaols, such as sorbitol, mannitol, dulcitol, glucose and sucrose;

(3) polyethers of the above lower alkyl polyols, for example, polyglycols, such as polyethylene glycols of the general formula $$OH-(CH_2-CH_2-O-)_n-CH_2-CH_2-OH$$

in which n is an integer in the range of from 1 to about 50, preferably an integer of from about 10 to about 25, in particular, diglycol, triglycol, polyethylene glycol-200 and polyethylene glycol-1000, and also polypropylene glycols of the general formula $$OH-(CH-CH_2-O)_n-CH-CH_2-OH$$
$$\quad\ \ |\qquad\qquad\quad\ \ |$$
$$\quad\ \ CH_3\qquad\qquad CH_3$$

in which n is an integer of from 1 to about 50, preferably an integer of from about 10 to about 25.

Polyglycols which are suitable as the alcohol component of the esters, preferably have a molecular weight of between about 200 and about 4,000.

(4) branched or unbranched aliphatic higher-molecular alcohols which contain more than two OH—groups and which are formed by ethoxylation and/or propoxylation of lower polyols, preferably tri- or tetraols, such as glycerol, diglycerol, trimethyolmethane or pentaerythritol. Advantageously, all of the hydroxy groups of the polyols are substituted by an ethylene oxide- or propylene oxide chain, and which may comprise up to about 50, in particular, from 3 to about 20, ethylene oxide units and/or propylene oxide units.

If the alkyl derivative which is capable of permanently chemically plasticizing cellulose hydrate is substantially comprised of an alkylamido- and/or an alkylamino-bis-dimethylene-triazinone-tetramethylol, these are preferably contained in the composition in a total amount of from about 5 to about 20% by weight, relative to the total weight thereof.

The total amount of permanently plasticizing alkyl derivatives may also be substantially comprised of a mixture including a mixture of different permanently plasticizing esters and a mixture of different alkyl derivatives containing methylol groups and a long-chain alkyl, preferably alkylamino- and/or alkylamido-bis-dimethylene-triazinone-tetramethylols.

The total amount of the synthetic polymer containing recurring oxyalkylene units and having at least two N-methylolcarbamate end groups in the molecule, is from about 5 to about 35% by weight, preferably from about 10 to about 25% by weight, relative to the total weight of the shaped article.

According to a preferred embodiment of the invention, the shaped article further comprises a secondary plasticizer. Within the scope of the description of the present invention, the term "secondary chemical plasticizer" is to be understood as those water soluble chemical compounds which, due to their molecular structure, are capable of having a plasticizing effect on shaped cellulose hydrate articles into which they are introduced. Due to their solubility in water, they are extractable from the shaped article when the latter is treated with water.

The secondary chemical plasticizers are therefore not suitable for permanently plasticizing the shaped article. Examples of suitable secondary chemical plasticizers are water soluble lower alkyl polyols, such as glycerol or glycol, and ethoxylated derivatives thereof, such as polyethylene glycols or mixtures thereof. The use of these chemical substances as plasticizers is well known in the art.

The plasticized chemically modified cellulose composition forming the shaped article preferably contains a total amount of from about 8 to about 20% by weight, preferably from about 10 to about 15% by weight, of water and advantageously a secondary plasticizer. The by weight percentage here always relates to the total weight of the shaped article.

Within the scope of the present specification, the characterization "capable of permanently plasticizing cellulose hydrate" is used; the expression "permanent" is intended to denote that the chemical agents which are designated in this way and are not extractable, or substantially not extractable, from the shaped articles by means of water. Due to the specific type of chemical groups therein and due to their molecular structure, these permanently plasticizing agents are substantially insoluble in water or are present in the shaped article in a firmly bonded state. The expression "substantially not extractable by water" is here to be understood to denote that, relative to the total amount of the chemical agent in the shaped article, only a negligibly small amount of this agent is transferred at the most from this article into the extracting agent and that, in the course thereof, the properties of the shaped article resulting from the presence of the chemical agent therein, are not measurably altered.

It is further an essential feature of the invention that even before the chemical reaction or crosslinking is completed, the synthetic polymer is also sufficiently firmly bonded in the composition that it is not extractable therefrom with water.

Within the present specification and claims, the definition "shaped article" is meant to denote the final product which is obtainable by the process according to the present invention (end product of the process).

The term "initially shaped body" is used to designate those shaped intermediate chemical products which are characterized by a spatial shape, yet which, due to their qualitative and quantitative chemical composition, in particular with respect to the molecular structure of their components, especially due to their high water content, have only a low dimensional stability, in particular no mechanical strength or only a comparatively low mechanical strength, as compared with the properties of the shaped article which is the end product of the process, and which differ from the end product of the process with respect to their spatial structure (density, physical homogeneity).

Depending on the actual shape of the initially shaped body, it will be transformed after drying, into a self-supporting shaped article, such as fibers, films or tubing. The manufacture of shaped cellulose hydrate articles of this type, in the form of fibers or of tubing optionally with a fiber insert from a viscose solution is known in the art. For the manufacture thereof, conventional devices are used. In the case where tubing is manufactured, these devices have an annular slit die, through which the viscose solution which is to be coagulated is spun, in the form of tubing, into a known precipitant fluid.

A detailed description of suitable synthetic polymers containing recurring oxyalkylene units and having at least one preferably about two reactive N-methylol-carbamate groups in the molecule is given below within the description of the process of preparing the above defined shaped articles.

In addition to the above defined essential components, water and, if appropriate, a secondary chemical plasticizer, the shaped articles manufactured by the process according to the present invention do not contain any other chemical substances in amounts which adversely affect the favorable properties of the shaped article.

The amounts of chemical crosslinking catalyst and/or chemical dispersing aid which may be contained in the shaped article, are negligibly low and have no influence on the properties of the shaped article.

Particularly preferred shaped articles according to the invention are, for example, those wherein the plasticized chemically modified cellulose composition comprises the following components in the amounts indicated below.

I.

1. Cellulose hydrate,
2. 10% by weight of glycerol monostearate, relative to the amount of cellulose hydrate,
3. 15% by weight of polyethylene glycol-1,000 di-(N-methylol-carbamate), relative to the total weight of the shaped article, (bonded to cellulose hydrate molecules),
4. 10% by weight of water, relative to the total weight of the shaped article, and
5. 10% by weight of glycerol, relative to the total weight of the shaped article, as a secondary plasticizer.

II.

1. Cellulose hydrate,
2. 8% by weight of stearylamido-bis-dimethylene-triazinone-tetramethylol, relative to the amount of cellulose hydrate,
3. 16% by weight of polyethylene glycol-1,000 di-(N-methylol-carbamate), relative to the total weight of the shaped article, (bonded to cellulose hydrate molecules),
4. 10% by weight of water, relative to the total weight of the shaped article, and
5. 9% by weight of glycerol, relative to the total weight of the shaped article, as a secondary plasticizer.

III.

1. Cellulose hydrate,
2. 12% by weight of a mixture of glycerol monostearate and polyethylene glycol-1,000 monostearate in a ratio of 1:1, relative to the amount of cellulose hydrate,
3. 18% by weight of polyethylene glycol-2,000 di-(N-methylol-carbamate), relative to the total weight of the shaped article, (bonded to cellulose hydrate molecules),
4. 8% by weight of water, relative to the total weight of the shaped article, and
5. 5% by weight of glycerol, relative to the total weight of the shaped article, as a secondary plasticizer.

IV.

1. Cellulose hydrate,
2. 8% by weight of a mixture of glycerol monostearate and glycerol monostearate/monocitrate in a ratio of 1:1 relative to the amount of cellulose hydrate and 6% by weight of stearylamido-bis-dimethylene-triazinone-tetramethylol, relative to the amount of cellulose hydrate,
3. 18% by weight of polyethylene glycol-2,000 di-(N-methylolcarbamate), relative to the total weight of the shaped article, (bonded to cellulose hydrate molecules),
4. 12% by weight of water, relative to the total weight of the shaped article, and 10% by weight of glycerol, relative to the total weight of the shaped article, as a secondary chemical plasticizer.

Shaped articles in the form of tubing, in particular fiber-reinforced tubing, are especially suitable for use as an artificial sausage casing when this tubing is conventionally coated on its inside with a coating of a synthetic polymer, which prevents direct contact of the sausage material with the tubing and acts as a barrier to migration or diffusion.

The present invention also relates to the use of the above described shaped articles, in the form of tubing as artificial sausage casings.

According to the present invention, the permanently plasticized shaped articles, especially in the form of tubing, preferably fiber-reinforced tubing, comprising the plasticized chemically modified cellulose compositions are prepared analogous to the usual procedure wherein an aqueous alkaline viscose solution is forced through the shaping orifice of a die body into a precipitant liquid, the initial shaped body is treated with regenerating liquids and then with washliquids, then optionally an aqueous solution containing a secondary chemical plasticizer is allowed to act on the shaped body, and it is then dried by heating to obtain the shaped article. According to the process of the present invention, the aqueous alkaline viscose solution is mixed with a liquid which contains the plasticizing alkyl derivative and having at least one alkyl group containing from about 9 to about 24 carbon atoms and the resulting mixture is forced through the shaping slit of a die body into a precipitating liquid to form the initially shaped body. After passing the shaped body through a wash liquid, an aqueous acid liquid which contains dissolved therein the liquid synthetic polymer containing recurring oxyalkalene units and having at least one, preferably at least two, terminal N-methylolcarbamate groups having the formula

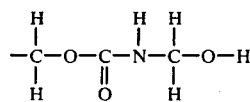

is allowed to act on the initial shaped body which is in the gel state, and subsequently the shaped body is subjected to the action of heat and dried. If appropriate, the dried shaped article is then moistened with water, in order to adjust its water content.

According to a preferred embodiment of the process, the aqueous acid fluid which contains dissolved therein the synthetic polymer which may be branched or unbranched and preferably is an ethylene oxide polymer having at least one, preferably at least two, terminal N-methylolcarbamate groups, additionally contains a secondary chemical plasticizer.

According to an embodiment of the process, the liquid mixture contains the aqueous alkaline viscose solution and dispersed therein at least one plasticizing alkyl derivative which is a plasticizing ester of an aliphatic monocarboxylic acid, having from about 10 to about 24 carbon atoms and an alcohol with at least two alcoholic groups in the molecule, at least one of which is esterified with said acid. Especially suitable permanently plasticizing esters have been described above.

According to another embodiment of the process, the liquid mixture contains the aqueous alkaline solution and dissolved therein at least one plasticizing alkyl derivate which is a plasticizing alkyl derivate containing 4 methylol groups and at least one alkyl group containing from about 9 to about 24, preferably from about 16 to about 18, and most preferably about 17 carbon atoms, in particular an alkylamido- or/and alkylamino-bis-dimethylene-triazinone-tetra-methylol, wherein the alkyl comprises from about 9 to about 24, preferably from about 16 to about 18, and most preferably about 17 carbon atoms.

According to another embodiment of the process, the liquid mixture contains the aqueous alkaline viscose solution and dispersed therein at least one permanently plasticizing ester and dissolved therein at least one plasticizing alkyl derivate having four methylol groups and at least one alkyl as mentioned above, advantageously an alkylamido- and/or an alkylamino-bis-dimethylene-triazinone-tetra-methylol, in particular a stearylamido- and/or a stearylamino-bis-dimethylene-triazinone-tetramethylol.

The chemical structure of alkylamino-bis-dimethylene-triazinone-tetramethylol and alkylamido-bis-dimethylene-triazinone-tetramethylol and their preparation are known in the art and are described in German Pat. No. 1,181,909, the disclosure of which is hereby incorporated by reference. Viscose solutions which contain alkylamino- or alkylamido-bis-dimethylene-triazinone-tetramethylol, are described in Belgian Pat. No. 823,410, the disclosure of which is hereby incorporated by reference.

The total amount of plasticizing alkyl derivatives which are capable of permanently plasticizing cellulose hydrate which is present in the aqueous alkaline viscose containing liquid mixture, is from about 0.5 to about 40% by weight, advantageously from about 5 to about 20% by weight, relative to the amount of cellulose.

If, according to one of the embodiments of the process, the aqueous alkaline viscose liquid mixture contains both permanently plasticizing esters and the above described alkyl derivatives, which contain methylol groups and a long-chain alkyl group, preferably a stearylamido- or a stearylamino-bis-dimethylene-triazinone-tetramethylol, the liquid mixture advantageously comprises about 10% by weight of each relative to the amount of cellulose in the liquid.

In order to prepare the aqueous alkaline viscose containing liquid mixture which contains permanently plasticizing esters dispersed therein, an aqueous alkaline viscose solution is mixed with a suitable amount of an aqueous dispersion of the permanently plasticizing ester, wherein the total amount of dispersed material is from about 10 to about 35% by weight, preferably from about 15 to about 25% by weight, relative to the total weight of the aqueous dispersion.

In order to prepare the aqueous dispersion containing a permanently plasticizing ester, known dispersing aids, such as, for example, alkyl-, aryl- or alkyl-aryl sulfonates or -sulfates, are advantageously used in amounts of from about 1 to about 5% by weight, preferably from about 3 to about 4% by weight, relative to the amount of dispersed material in the dispersion.

The dispersing agents assist in uniformly distributing the permanently plasticizing ester in the aqueous liquid.

The aqueous liquid wherein the permanently plasticizing ester is dispersed may comprise a major portion of water and, in addition thereto a minor portion of a preferably water soluble organic solvent, such as a lower alkyl alcohol, for example, ethanol, butanol, propanol or isopropanol.

However, the liquid containing permanently plasticizing esters can also be a solution of the ester in a suitable preferably water miscible organic solvent, such as, for example, alcohols, in particular aliphatic alcohols.

The viscose containing liquid mixture can also contain a mixture of permanently plasticizing esters of different chemical composition, and the same also applies to the alkyl derivatives containing methyl groups and a long-chain alkyl group.

The viscose solution can also contain a blend of the two abovementioned mixtures.

The preferred aqueous alkaline viscose containing liquid mixtures contain, as the permanently plasticizing esters, glycerol monostearate or polyethylene glycol-1,000 monostearate or a mixture of the two in a ratio of 1:1 or glycerol monostearate-mono-citrate or -monolactate or mixtures of the before-mentioned mixed esters.

It is essential that the permanently plasticizing esters are not soluble in water.

In the manufacture of the shaped articles, ready dispersibility of the water-insoluble esters is important whenever they are to be used in the form of aqueous dispersions.

The alkaline aqueous viscose containing liquid mixture containing permanently plasticizing alkyl derivatives is prepared by mixing an alkaline aqueous viscose solution with an appropriate amount of an aqueous dispersion of suitable concentration of the permanently plasticizing ester and/or an appropriate amount of an aqueous solution of suitable concentration of the plasticizing alkyl derivate containing methyl groups.

Within the scope of the present specification "viscose solution" is intended to denote a solution of cellulose xanthate dissolved in an aqueous alkaline medium. Viscose solutions of this type are knwon in the art. Within the process of the present invention, it is advisable to use a viscose solution which comprises the cellulose xanthate dissolved in about a 7% sodium hydroxide solution and which has a gamma value of from about 25 to about 35, and contains from about 82 to about 83% by weight of water, from about 7 to about 8% by weight of cellulose, from about 5.5 to about 7% by weight of pure NaOH bonded to cellulose and also about 2.5% by weight of sulfur bonded to cellulose.

Preferably, an aqueous alkaline viscose solution of a type which has the following characteristic data is used:
  cellulose content about 7% by weight,
  alkali content about 5.8% by weight, each relative to the total weight of the solution;
  gamma value 29.4;
  NaCl ripening value 2.50;
  viscosity of the solution in a falling ball viscometer 137 seconds (measured at 20° C.).

An aqueous solution containing dissolved therein as the essential constituent the synthetic polymer is allowed to act on the washed initially shaped body in its gel state. Suitable synthetic polymers are branched and/or unbranched polymers containing recurring oxyalkylene units and having at least one, preferably at least two, terminal N-methylolcarbamate groups corresponding to the formula

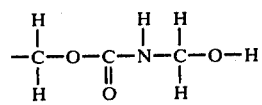

Due to the chemical composition and/or their molecular structure, the synthetic polymers which comprise recurring oxyalkylene units and wherein at least two terminal $CH_2$—OH—groups have been converted into N-methylolcarbamate end groups, are both reactive and capable of having a plasticizing effect on cellulose hydrate.

The synthetic polymers comprising recurring oxyalkylene units and having at least two terminal N-methylolcarbamate groups, are derived from straight-chain and/or branched so-called base polymers which comprise recurring oxyalkylene units and contain at least one terminal OH group.

The chemically modified polymer is formed from the corresponding base polymer by a chemical conversion of at least one, preferably at least two, terminal groups of the formula

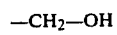

to groups of the formula

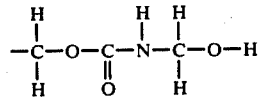

This chemical conversion which proceeds through several reaction stages is known and is not a subject of the present invention.

The three-step chemical reaction sequence, by means of which it is possible to convert OH groups in a chemical compound into N-methylolcarbamate groups, is known. By way of example, the preparation of polyglycol- (1,000)-bis-carbamide-bis-N,N'methylol from polyglycol- (1,000) will be described below.

The OH groups in other chemical compounds having terminal "—$CH_2$—OH" groups, can be converted into N-methylolcarbamate groups in an analogous manner.

First reaction step

Phosgenation of polyglycol 1,000 g (1 mole) of polyglycol having molecular weight of 1,000 are introduced into a 2 l stirred flask and heated therein. As soon as the polyglycol has melted (45° C.), 220 g (2.2 moles) of phosgene are introduced into the melt.

The introduction of phosgene is carried out over a total period of time for about 2 hours.

After one third (about 70 g) of the total amount of phosgene has been introduced into the warmed melt, the temperature thereof is kept at 35° to 40° C. until the introduction is completed.

Dry nitrogen is then passed through the reaction product in the flask at a temperature of the product of from 30° to 35° C. for about 2 hours.

The reaction mass in the flask is then maintained for a period of about 4 hours under a degree of vacuum which is usually applied in the laboratory.

The analytical data of a sample of the phosgenation product (polyglycol bis-chlorocarbonate) are as follows: chlorine content: total 6.0 to 7.3% (theory 6.3%); yield: 1,125 g (theory 1,125 g).

The product prepared in the first reaction step is designated as A in the following text.

Second reaction step

Amidation of the polyglycol bis-chlorocarbonate prepared in the first reaction step 960 g (1.2 l) of isobutanol are introduced into a 4 l stirred flask and the liquid is then saturated with about 20 g of ammonia.

A total of 1,120 g of the phosgenation product A (in the liquid state), corresponding to one mole of polyglycol bis-chloro-carbonate, are added dropwise at a uniform rate to the above liquid which is maintained at a temperature of 20° to 30° C., in the course of a period of 3 to 4 hours, while stirring.

At the same time, about 70 g of ammonia gas are passed into the liquid so that excess ammonia is always present in the reaction vessel.

The liquid in the reaction vessel is then heated to 90° to 95° C., where upon excess ammonia escapes from the liquid, and precipitated ammonium chloride (about 110 g) is then filtered off from the liquid through a filter, for example a Seitz pressure filter.

The filter residue is rinsed with 120 g (150 ml) of isobutanol at a temperature of 80° to 90° C.

The filtrate is freed from isobutanol under a degree of vacuum, which is usually applied in the laboratory. At the end of the procedure a vacuum of a water pump is applied at a temperature of the liquid of 100° C. The analytical data of a sample of the polyglycol bis-carbaminate prepared in the second reaction step are as follows: nitrogen content: total 2.4 to 2.8%; yield: 1,050 g (theory 1,086 g).

The polyglycol bis-carbaminate prepared in the second reaction step is designated as B in the following text.

Third reaction step

Reaction of Product B with formaldehyde 1,050 g of product B (corresponding to 1 mole of polyglycol-(1,000) bis-carbaminate) are introduced into a reaction vessel, and 250 g of water and 150 g of an aqueous 40% formalin solution (2 moles of formaldehyde) are added, while stirring.

The reaction mixture is then slowly heated to a temperature of 65° to 70° C., whereby a saturated sodium carbonate solution is continuously added so that a pH value of from 8 to 9 is always maintained in the liquid. The total amount of added sodium carbonate solution is 60 ml.

After the sodium carbonate solution has been added, the liquid is stirred for a further hour at a temperature of 65° to 70° C. The yield of the end product from the third reaction step, that is to say polyglycol-(1,000) bis-carbamide-bis-N,N'-methylol, is 1,500 g. The end product is obtained in an aqueous solution.

The first reaction step is described in the textbook "Methoden der organischen Chemie [Methods of Organic Chemistry]", Houben-Weyl, volume VIII, page 138 (1952), the disclosure of which is hereby incorporated by reference. The second reaction step is known from the same textbook, volume VIII, pages 101 to 104.

The third reaction step is known from "Kunststoff-Handbuch [Plastics Handbook]", Carl-Hanser-Verlag, Munich, 1968, volume X, pages 153 to 227.

The base polymer from which the chemically modified polymer is derived is formed by an addition-polymerization of an alkylene oxide, in particular ethylene oxide or propylene oxide, or by addition-copolymerization of a monomer mixture of ethylene oxide and propylene oxide in a ratio of from about 90:10 to about 10:90. Polymers containing a predominant proportion of ethylene oxide are preferred. The base polymer can also be formed by an addition copolymerization of an alkylene oxide, in particular ethylene oxide or propylene oxide or mixtures thereof and aliphatic and/or aromatic monomers preferably containing from about 2 to about 8 carbon atoms which are capable of undergoing a polyaddition reaction with the alkylene oxide and which in each case contain at least one, preferably at least two, chemically reactive groups which are alcoholic OH groups, COOH groups or $NH_2$ groups or primary or secondary amino groups having an alkyl group containing from 1 to about 8 carbon atoms, or mixtures thereof.

Preferably the shaped articles comprise at least one chemically modified cellulose product of a type which is formed by a chemical reaction of cellulose hydrate with the synthetic polymer containing two or more terminal N-methylolcarbamate groups and recurring oxyalkylene units.

Preferred synthetic polymers comprising at least two N-methylolcarbamate groups and recurring oxyalkylene units are polymers which are derived from base polymers which are formed by the copolymerization of mixtures which contain ethylene oxide or propylene oxide, or ethylene oxide and propylene oxide in a ratio of from about 90:10 to about 10:90, preferably mixtures containing a predominant amount of ethylene oxide, and at least one of the following monomers which are capable of a polyaddition reaction with the abovementioned alkylene oxides:

(a) aliphatic mono-and/or poly-alcohols or/and aromatic mono- or poly-alcohols, (b) aliphatic mono- and/or poly-amines or/and aromatic amines, (c) aliphatic mono- or poly-carboxylic acids and/or aromatic mono- or poly-carboxylic acids, (d) aliphatic hydroxycarboxylic acids, (e) aliphatic hydroxyamines or (f) mixtures of the chemical substances mentioned under (a) to (e).

Reactive chemical compounds, which are particularly suitable for a copolymerization with an alkylene oxide, for the manufacture of appropriate base polymers are cited below:

Aliphatic monoalcohols having 1 to about 18 carbon atoms, preferably 2 to about 12 carbon atoms, in particular ethanol, butanol, n-propanol, isopropanol, hexyl alcohol and cetyl alcohol. Preferably aliphatic diols, in particular lower alkylene diols such as ethane diol, propane-diol and butane-diol. Polyols, especially aliphatic polyols, particularly suitable are glycerol, pentaerythritol, hexitols, such as sorbitol, mannitol and dulcitol, glucose, sucrose and polyglycols, such as polyethylene glycols of the general formula $$HO-(-CH_2-CH_2-O-)_n-CH_2-CH_2-OH$$

in which n is an integer from 1 to about 120, preferably from about 50 to about 60, in particular diglycol, triglycol, polyethylene glycol-200 or polypropylene glycols of the general formula $$HO-(-CH_2-CH_2-CH_2-O-)_n-CH_2-CH_2-CH_2-OH$$

in which n is an integer from 1 to about 120, preferably from about 50 to about 60.

Particularly suitable aromatic alcohols are benzyl alcohol and phenyl-ethyl alcohol.

Particularly suitable aliphatic monocarboxylic acids are acetic acid, propionic acid, butyric acid, valeric acid, caproic acid and caprylic acid.

Particularly suitable polyvalent carboxylic acids are oxalic acid, malonic acid, succinic acid, glutaric acid, adipic acid and pimelic acid.

Particularly suitable amines are especially aliphatic diamines having an alkylene chain containing from 1 to about 6 carbon atoms, such as ethylenediamine and hexamethylenediamine.

An example of a suitable hydroxyamine is 1-hydroxy-6-amino-hexane.

Preferred branched or unbranched synthetic polymers which contain recurring oxyalkylene units and have two or more terminal N-methylolcarbamate groups, advantageously are derived from base polymers which are formed by ethoxylation and/or propoxylation of a polyol containing 2 to about 6 carbon atoms such as glycerol, diglycerol, trimethylol-methane, pentaerythritol and also triethanolamine, a diamine containing 2 to 6 carbon atoms such as ethylene-diamine, diethylenetriamine and triethylene-tetramine. Advantageously one polyalkylene glycol chain containing up to 50, in particular up to 20, ethylene oxide units and/or propylene units is present per each OH group in the former case and for each active hydrogen in the hydroxy-amino groups and secondary amino groups in the latter case.

The molecular weight of the unbranched and/or branched polymers containing recurring oxyalkylene units and having at least one preferably, at least two, terminal N-methylolcarbamate groups suitably is from about 200 to about 6,000, preferably from about 600 to about 2,500. The above described polymers which contain recurring oxyalkylene units and terminal N-methylolcarbamate groups, and having a molecular weight within the above indicated range are soluble in water.

Unbranched polymers of the above described type, which possess two terminal N-methylolcarbamate groups, and have a molecular weight from about 800 to about 2,500 are especially preferred.

The term "unbranched" is intended to denote that, the molecule chain of the base polymer does not have any side chains carrying reactive OH groups.

Likewise preferred branched polymers which contain recurring oxyalkylene units and have more than two terminal N-methylolcarbamate groups have a molecular weight of from about 600 to about 1,800. These polymers are derived from base polymers obtainable by an addition copolymerization of an alkylene oxide, preferably ethylene oxide, and an aliphatic chemical compound which is capable of undergoing a polyaddition reaction with this alkylene oxide and which has more than two reactive groups in its molecule, in particular more than two OH groups—for example glycerol, trimethylolpropane, pentaerythritol, glucose, sorbitol, mannitol and sucrose.

The aqueous solution with which the shaped body is treated contains dissolved therein an amount of from about 5 to about 30% by weight, preferably an amount of from about 8 to about 20% by weight and most preferably an amount of about 12% by weight, of the synthetic polymer relative to the total weight of the solution. In the following text, the abbreviated designation "polymer solution" is used for these solutions.

The polymer solution is an acid solution; advantageously, it has a pH value from about 1 to about 5, preferably a pH value from about 1.5 to about 3, for example a pH of about 2.5.

The pH value of the polymer solution is adjusted by adding a corresponding amount of an acid as a catalytically active agent, for example by adding a corresponding amount of sulfuric acid, to the polymer solution.

The aqueous polymer solution suitably is applied to the shaped body at a temperature of from about 20° to about 90° C., preferably a temperature of from about 40° to about 80° C., for example a temperature of about 60° C.

In place of, or in addition to, the catalytically active acids which are capable of accelerating the reaction between reactive groups of the polymer dissolved in a solution and reactive groups of cellulose hydrate, the aqueous polymer solutions may contain a catalytically active compound in an amount of from about 5 to about 50 g/l of the polymer solution, preferably in an amount of from about 10 to about 20 g/l of the polymer solution.

All salts which are suitable for accelerating the said chemical reaction, for example mineral salts of weak base and a strong acid such as $MgCl_2$ or $NH_4Cl$, are suitable catalysts.

Advantageously, the polymer solution contains at least one of the abovementioned secondary plasticizers, for example glycerol, in an amount of about 2 to about 25% by weight, preferably from about 5 to about 20% by weight and most preferably about 8% by weight, relative to its total weight.

By way of example, the process will be further described in the following text, using the preferred embodiment of manufacturing of a shaped article in the form of tubing as an example.

A liquid mixture containing an aqueous viscose solution and a permanently plasticizing ester—for example glycerol monostearate—is pressed through the annular slit orifice of a die body into a conventional precipitating liquid. The initially shaped body emerging from the annular slit die and entering into the precipitating bath has the shape of tubing.

Preferably a precipitating liquid is used which is known in the art under the name "Mueller-bath". It is an aqueous solution of $H_2SO_4$ which may contain, for example, 15% by weight of $H_2SO_4$ and 17% by weight of $Na_2SO_4$, relative to the total weight of the liquid. When the viscose solution enters into the precipitating bath, the viscose sol is transformed into a viscose gel.

The shaped article is guided through the precipitant bath, at a speed of, for example, 10 m/minute.

The initially shaped body is then successively subjected to the action of several conventional regenerating liquids which each consists of an aqueous solution of a different amount of sulfuric acid, whereby the acid concentration is successively increased. For example, the precipitating bath which is used first may have a concentration of, for example, 0.5% by weight of sulfuric acid and the precipitating bath which is used last may then have a concentration of, for example, 3% by weight of sulfuric acid. The treatment with regenerating liquids is effected by passing the shaped body continuously through different troughs each filled with the corresponding liquid.

Subsequent to the treatment with the regenerating liquids, the shaped body is washed with water, preferably at a temperature of about 60° C.; for this purpose, it is passed through a trough filled with this water. The resulting shaped body in the gel state (water content 270–330% by weight) is then subjected to the action of an acid aqueous solution of a polymer which contains recurring oxyethylene units and has at least one, preferably at least two terminal N-methylolcarbamate groups, for example polyethylene glycol-1,000 di-(N-methylolcarbamate). This solution has, for example, a pH value of 2.5 which is adjusted by the addition of sulfuric acid. Advantageously the solution additionally contains a secondary chemical plasticizer, for example glycerol. The treatment with this polymer solution is effected by passing the shaped body through a trough which is filled with the said aqueous polymer solution. The solution has, for example, a temperature of 60° C. The period of time for the treatment of the tubing with the above-mentioned solution is adjusted in such a way, that it corresponds to allowing a hypothetical tubing section to remain in the solution for a period of time of between about 120 minutes and about 30 seconds, in particular a period of time of between about 30 minutes and about 1 minute, and especially a period of about 5 minutes.

After the polymer solution has acted on the tubing, the latter is subjected to heat at a temperature which effects heating of the tubing to a temperature of between about 70° and about 140° C., preferably between about 90° and about 120° C., for example a temperature of about 110° C., whereby a high temperature is always associated with the short period of treatment.

The tubing may be heated, for example, by passing the tubing at a constant speed through a drying tunnel of suitable length, for example a tunnel of 50 m length, charged with hot air of appropriate temperature. In this step, the residence time in the drying tunnel is from about half a minute to about 20 minutes, depending on the speed of the movement of the tubing in the direction of the longitudinal axis. This speed preferably is from about 5 to about 30 m/minute.

During the heating, the tubing is maintained in the inflated state by means of introducing a supporting amount of air into the interior of the tubing. The supporting air is introduced into the tubing before the drying is started. Before moving into the drying tunnel, and likewise after leaving the drying tunnel, the tubing is passed through a pair of squeeze rollers.

By means of the heat treatment, the tubing is dried to such an extent that it has a desired residual water content, for example a water content of 10% by weight, relative to the total weight of the tubing.

The heat treatment of the tubing yields as the end product of the process, a tube shaped article, which has the properties which are desired according to the present invention.

The process according to the present invention makes it possible in a simple manner to prepare shaped articles of a cellulose composition, in particular tubing, which is modified with respect to its chemical structure and also its spatial structure, without altering the general manufacturing conditions for preparing shaped cellulose articles and without introducing additional process steps.

The shaped articles which are manufactured by the process of the present invention, in particular tubing which is manufactured by the process of the present invention, are improved with respect to a large number of properties as compared with prior art shaped articles which are manufactured by known processes and are based on chemically modified celluose. These improvements are of advantage especially in the case of tubing which, after coating of its inside with a coating which does not transmit water vapour, is to be used as an artificial sausage casing.

Due to the characteristic chemical composition of the shaped articles and the characteristic chemical structure of the materials forming them, the shaped articles are distinguished by special properties.

Shaped articles in the form of tubing, especially fiber-reinforced tubing, which are used as artificial sausage skins are subjected to a treatment with hot water or superheated steam in the course of further processing, after they have been filled with the sausage composition and have been closed on both sides.

The amount of secondary chemical plasticizer contained in the sausage casings is thus almost completely extracted from the casing.

When the tubing according to the invention is used as an artificial sausage casing, the chemical nature of the constituents forming it and due to the special internal structure of the chemical composition forming the sausage skins, the values for the elongation and tear propagation resistance of the sausage skin are so high even after the treatment with hot water or superheated steam that these sausages can be cut without tearing, after they have been dried. The shaped articles according to the present invention are effectively plasticized due to their internal structure. A structural plasticization is achieved which largely prevents shrinkage processes in the shaped articles, which otherwise occur when the plasticizer migrates out of the shaped article or is extracted therefrom.

In prior art plasticized shaped cellulose hydrate articles, a physical densification of the shaped articles may be caused by the fact that chemical agents, contained therein which are capable of chemically plasticizing cellulose hydrate, are extracted therefrom by treatment with water or that the shaped articles to shrink due to the action of heat during the drying process. Such a densification is substantially prevented in the shaped articles according to the present invention since the space-filling synthetic polymer which comprises recurring oxyalkylene units and has at least one, preferably at least two, terminal N-methylolcarbamate groups is firmly bonded in the composition forming the shaped articles, or the chemical reaction product of these polymers, provides a resistance against such a densification. Thus, when the tubing manufactured according to the present invention is used as an artificial sausage casing, its shrinkage on drying of the sausage and hence the internal pressure in the sausages are considerably reduced.

As a result thereof the undesired squeezing-out of the sausage material, after the sausage has been cut, does not take place to any significant extent.

If a particularly prefered tubing according to the invention, which contains a secondary chemical plasticizer, is used as an artificial sausage casing, well filled sausages wherein the skin is in firm contact with the sausage material can be prepared when, during the preparation of the sausage, the secondary plasticizer is completely extracted from the skin so that the latter shrinks at least to such an extent that the sausage skin is in wrinkle-free contact with the material filled in, in the desired manner. A substantial advantage of the tubing which can be manufactured according to the invention is that the other properties of cellulose hydrate skins which are used as an artificial sausage skin, are preserved because the chemical modification of the cellulose hydrate is carried out only after the structure, responsible for these properties, of the cellulose hydrate has already been formed.

Compared with tubing, which is manufactured from cellulose hydrate by known processes and contains a plasticizer, the shaped articles, in particular tubing, manufactured by the process according to the present invention thus have the advantage that they possess the favorable properties of cellulose hydrate, yet without the disadvantages of the former.

EXAMPLE 1

A paper fiber tubing of 60 bore is passed through the annular slit of a conventional die for two-sided coating whereby it is impregnated with an aqueous alkaline viscose containing liquid and is simultaneously coated with the latter on the inside and on the outside in a conventional procedure, e.g., as is described in the British Pat. No. 1,259,666, the disclosure of which is hereby incorporated by reference. In addition to the viscose, the liquid contains 12% by weight of glycerol monostearate, relative to the amount of cellulose. The aqueous alkaline liquid which contains the viscose solution and the glycerol monostearate dispersed therein is prepared by mixing an aqueous alkaline viscose solution with the required amount of an aqueous glycerol monostearate dispersion of an appropriate concentration, while stirring vigorously. The tubular structure with a fiber reinforcement is then introduced into a conventional precipitating bath the composition of which has been described above the afterwards is treated with a conventional regenerating liquid and subsequently is washed with water.

The resulting tube shaped body which is in the gel state has a swelling value of about 320% by weight; it is then passed in flattened form at a constant speed of 10 m/minute through a trough which is filled with an aqueous solution of the following composition: 12% by weight of polyethylene glycol-1,000-di-(N-methylolcarbamate), 8% by weight of glycerol and 80% by weight of water.

The above aqueous solution is adjusted to a pH value of 2.2 by adding an appropriate amount of sulfuric acid, and it is used at a temperature of 70° C.

The tubing is then inflated by means of introducing a supporting amount of air in its cavity and is passed, horizontally and in the direction of its longitudinal axis, at a speed of 10 m/minute through a drying tunnel which is operated with hot air and has a temperature of 90° C. at the entry of the tunnel and a temperature of 120° C. at the exit from the tunnel. During this procedure the tubing is dried to such an extent that, after leaving the drying tunnel, it has a water content of about 6–8% by weight, relative to its total weight.

The tubing which is inflated by means of supporting air in its cavity is guided through the drying tunnel in the following manner: initially the flat-laid tubing is passed through the gap of a first pair of squeeze rollers before it enters into the drying tunnel; after the tubing has emerged from the drying tunnel, it is passed through the gap of a second pair of squeeze rollers. At the start of the operation, supporting air is introduuced into the cavity of the piece of tubing between the two pairs of squeeze rollers. As the process proceeds further, this supporting air then constantly maintains the section of tubing which is in the drying tunnel in the inflated state.

The tubing is then adjusted to a water content of 10% by weight, relative to its total weight, by moistening it with water.

If, however, the tubing requires a special coating on its inside for its intended use as an artificial sausage casing, this is usually applied to in the following manner. After the tubing has been treated with the aqueous acid polymer solution and before it is passed through the drying tunnel, advantageously an inside layer of a chemical anchoring agent which consists of an epichlorohydrin-polyamine-polyamide resin as is described in the British Pat. No. 1,417,419 the disclosure of which is hereby incorporated by reference is applied to the tubing. The resin is here applied in the form of an aqueous solution, for example containing 1% by weight of the precoating resin, to the inside of the tubing. The volatile agent of the layer is then evaporated by heating the tubing and the preanchoring layer is thus formed on the inside of the tubing. Subsequently an aqueous dispersion, containing for example of 8% by weight, of a vinylidine chloride copolymer which is formed by copolymerisation of a mixture containing 88% by weight of vinylidene chloride, 3% by weight of acrylic acid, 7.5% by weight of acrylonitrile and 1.5% by weight of methyl acrylate relative to total amount of monomers, is then applied to the pre-coated inside of the tubing.

The tubing is then subjected to an elevated temperature which effects heating of the tube to a temperature of from about 80° to about 140° C., by passing the tubing through a drying tunnel operated with hot air of a suitable temperature.

During this heating, the aqueous dispersing agent is expelled from the liquid layer on the inside of the tubing, so that a polymeric film coating is formed on the inside of the tubing. At the same time, the tubing is dried by means of this heat treatment to a water content of about 6% by weight, relative to its total weight. The dried tubing is then adjusted to a water content of about 10 to 12% by weight relative to its total weight by moistening it with water.

The process for coating the inside of a cellulose hydrate tubing is described in the British Pat. No. 1,201,830 the disclosure of which is hereby incorporated by reference. The preparation of cellulose hydrate tubing, containing on its inside an adhesion-promoting polymer coating, is known from British Pat. No. 1,417,419. Therefore details relating to this process are not described within the present specification.

The following properties have been determined on samples of the piece of tubing (60 bore) prepared as above. The test results are given in table I below:

| Property | Comparative tubing | Tubing manufactured according to Example 1 |
|---|---|---|
| Bursting pressure, m water gauge | 11.5 | 10.6 |
| Elongation at burst, % | 4.4 | 5.6 |
| Breaking length, longitudinal, m | 3,400 | 3,400 |
| Breaking length, transverse, m | 3,000 | 3,125 |
| Elongation at break, longitudinal, % | 30 | 26 |
| Elongation at break, transverse, % | 36 | 32 |
| Weight per m², g | 98 | 96 |
| Wet shrinkage | | 45% less than in the comparative tubing |
| Swelling value | 112 | 96 |

| Property | Comparative tubing | Tubing manufactured according to Example 6 |
|---|---|---|
| Bursting pressure, m water gauge | 12.0 | 10.0 |
| Elongation at burst, % | 6.6 | 5.6 |
| Breaking length, longitudinal, m | 3,550 | 3,575 |
| Breaking length, transverse, m | 3,200 | 2,675 |
| Elongation at break, longitudinal, % | 28 | 28 |
| Elongation at break, transverse, % | 30 | 32 |
| Weight per m², g | 106 | 112 |
| Shrinkage | | 35% less than in the comparative tubing |

Another test sample of the tubing manufactured according to Example 1 is soaked for 20 minutes in hot water of 80° C; subsequently the test sample is dried. Thereafter, its water content is 4% by weight, relative to the total weight of the test sample. The comparative tubing is a cellulose hydrate tubing into which 25% by weight of secondary plasticizer, relative to its total weight have originally been incorporated during its preparation.

EXAMPLE 2

A tubing is prepared as is described in Example 1, but with the modification that the viscose containing liquid contains 8% weight of polyethylene glycol-1,000 monosterate, relative to the amount of cellulose.

EXAMPLE 3

A tubing is prepared as is described in Example 1, but with the modification that the viscose containing liquid contains 12% by weight of a mixture of glycerol monosterate/polyethylene glycol-1,000 monosterate in a ratio of 1:1.

EXAMPLE 4

A tubing is prepared as is described in Example 1, but with the modification that the viscose containing liquid contains 10% by weight of a glycerol ester, wherein one OH group of the glycerol is esterified with stearic acid and a further OH group is esterified with citric acid or lactic acid.

EXAMPLE 5

Tubes are prepared as is described in the Examples 1 to 4, but with the modification that in each case the viscose and ester containing liquid additionally contains 15% by weight of stearyl-amido-bis-dimethylene-triazinone-tetramethylol.

EXAMPLE 6

Tubes are prepared as is described in Examples 1 to 5, but with the modification that the aqueous acid polymer solution contains 12% by weight of poly-glycol-2,000 di-(N-methylolcarbamate), 8% by weight of glycerol and 80% by weight of water, and has a pH value of 2.5, wherein the sulfuric acid serves as the catalytically acting ingredient.

Sausages which have been prepared with casing of the above mentioned type are not prone to bursting and tearing when they are cut open, even at a low relative humidity (20 to 40%). The sausage material is not forced out of the cut surface when a cut is made.

EXAMPLE 7

Tubes are prepared as is described in Examples 1 to 5, but with the difference that the hot aqueous polymer solution, which is used at 70° C., has the following composition: 12% by weight of propoxylated butanediol-di-N-methylolcarbamate of molecular weight 1,600, 8% by weight of glycerol and 80% by weight of water, and has a pH value of 2.2, wherein sulfuric acid serves as the catalytically active ingredient.

EXAMPLE 8

Tubes are prepared as is described in Examples 1 to 5, but with the modification that the hot fluid which is used at 70° C., has the following composition: 12% by weight of ethoxylated hexamethylenediamine-di-N-methylol-carbamate of molecular weight 1,200, 8% by weight of glycerol and 80% of water, and has a pH value of 2.5, wherein sulfuric acid serves as a catalytically active ingredient.

EXAMPLE 9

Tubes are prepared as is described in Examples 1 to 5, but with the modification that the hot fluid which is used at 70° C., has the following composition: 12% by weight of ethoxylated pentaerythritol-di-N-methylolcarbamate of molecular weight 1,500, 8% by weight of glycerol and 80% by weight of water, and has a pH value of 2.5, wherein sulfuric acid serves as a catalytically active ingredient.

EXAMPLES 10 to 12

Tubes are prepared as is described in Examples 1 to 5, but with the modification that the composition of the fluid with which the tubing is treated corresponds to that of Example 7 or of Example 8 or of Example 9.

EXAMPLE 13

A tubing is prepared as is described in Example 1, but with the difference that the aqueous viscose containing liquid contains dissolved therein 10% by weight of stearylamido-bis-diemthylene-triazinone-tetramethylol relative to the amount of cellulose, and that after the washing process the flat-laid tubular structure which is in the gel state is passed at a speed of 10 m/minute through a trough which is filled with a fluid of the following composition: 12% by weight of polyglycol di-(N-methylolcarbamate), 8% by weight of glycerol and 80% by weight of water, which has a pH value of 2.5, and wherein sulfuric acid serves as a catalytically active ingredient. The resulting tubing of 60 bore has the following properties:

| Property | Comparative tubing | Tubing manufactured according to Example 13 |
|---|---|---|
| Bursting pressure, m water gauge | 11.1 | 10.4 |
| Breaking length, longitudinal, m | 3,325 | 3,750 |
| Breaking length, transverse, m | 3,275 | 3,525 |
| Elongation at break, longitudinal, % | 33 | 30 |
| Elongation at break, transverse, % | 39 | 34 |
| Weight per m², g | 100 | 95 |
| Wet Shrinkage | | 50% less than in comparative tubing |
| Swelling value | 110 | 89 |

What is claimed is:

1. A shaped article comprising a plasticized chemically-modified cellulose composition of high mechanical strength which comprises:

(a) a plasticized cellulose composition containing a plasticity-enhancing amount of at least one plasticizing alkyl derivative containing at least one alkyl group containing from about 8 to about 24 carbon atoms, said plasticizing alkyl derivative being selected from the group consisting of (i) a substantially water insoluble ester of an aliphatic monocarboxylic acid containing from about 9 to about 25 carbon atoms with a polyalcohol comprising at least two hydroxy groups at least one of which is esterified with said aliphatic monocarboxylic acid, and (ii) a combination of said ester with an alkylamido-bis-dimethylene-triazinone-tetramethylol or an alkylamino-bis-dimethylene-triazinone-tetramethylol;

(b) incorporated in said cellulose composition at least one synthetic polymer containing recurring oxyalkylene groups and at least one terminal N-methylol carbamate group having the formula —CH₂—O—CO—NH—CH₂—OH; 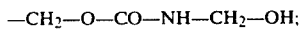

and (c) water.

2. The shaped article as defined in claim 1, wherein said plasticizing alkyl derivative comprises said combination of said ester and said tetramethylol compound.

3. The shaped article as defined in claim 1, prepared by a process which comprises the steps of:

(a) mixing a viscose containing solution and a liquid comprising at least one plasticizing alkyl derivative containing at least one alkyl group having from about 8 to about 24 carbon atoms, said plasticizing alkyl derivative being selected from the group consisting of (i) a substantially water insoluble ester of an aliphatic monocarboxylic acid containing from about 9 to about 24 carbon atoms with a polyalcohol comprising at least two hydroxy groups at least one of which is esterified with said aliphatic monocarboxylic acid, and (ii) a combination of said ester and an alkylamido-bis-dimethylene-triazinone-tetramethylol or an alkyl-amino-bis-dimethylene-triazinone-tetramethylol, to form a liquid mixture;

(b) introducing the liquid mixture through the shaping orifice of a die into a precipitating liquid to precipitate a shaped body comprising the hydrated cellulose in a gel state and a plasticity-enhancing amount of said plasticizing alkyl derivative;

(c) washing the precipitated shaped body in the gel state;

(d) treating the washed shaped body in the gel state with an acidic aqueous solution containing at least one synthetic polymer containing recurring oxyalkylene groups and at least one terminal N-methylol carbamate group having the formula —CH₂—O—CO—NH—CH₂—OH 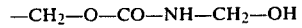

to incorporate into the shaped body a mechanical strength enhancing amount of the synthetic polymer; and (e) heat treating the treated shaped body to obtain a dried shaped article comprising the plasticized chemically modified cellulose composition of high mechanical strength.

4. The shaped article as defined in claim 1 which further comprises a secondary plasticizer.

5. The shaped article as defined in claim 1 wherein the synthetic polymer comprises at least two terminal N-methylol-carbamate groups.

6. The shaped article as defined in claim 1 wherein the plasticizing alkyl derivate comprises said ester.

7. The shaped article as defined in claim 6 or 2 wherein the aliphatic monocarboxylic acid contains from about 16 to about 18 carbon atoms.

8. The shaped article as defined in claim 6 or 2 wherein the polyalcohol is an aliphatic alcohol.

9. The shaped article as defined in claim 8 wherein the polyalcohol is a lower alkyl polyol containing from about 2 to about 6 carbon atoms, and from about 2 to about 6 hydroxy groups.

10. The shaped article as defined in claim 8 wherein the polyalcohol is a polyether of a lower alkyl polyol.

11. The shaped article as defined in claim 10 wherein the polyalcohol is a polyalkylene glycol of the general formula HO—((CH₂)ₓ—O)ₙ—(CH₂)ₓ—OH 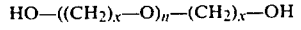

wherein n is an integer of from 1 to about 50, and x is 2 or 3.

12. The shaped article as defined in claim 6 or 2 wherein at least one hydroxy group of the polyalcohol in the ester is esterefied with a carboxylic acid containing a second functional group selected from the group consisting of hydroxy and carboxyl.

13. The shaped article as defined in claim 6 or 2 wherein the ester is glycerol monostearate.

14. The shaped article as defined in claim 6 or 2 wherein the ester is polyethylene glycol-1000 monostearate.

15. The shaped article as defined in claim 6 or 2 wherein the plasticizing alkyl derivate comprises a mixture of glycerol monostearate and polyethylene glycol-1000 monostearate in a ratio of 1:1.

16. The shaped article as defined in claim 12 wherein the ester is an esterified glycerol in which one OH-group is esterified with stearic acid and a further OH-group is esterified with lactic or citric acid.

17. The shaped article as defined in claim 1 wherein said tetramethylol compound comprises stearylamido-bis- dimethylene-triazinone-tetramethylol.

18. The shaped article as defined in claim 4 wherein the plasticizing alkyl derivative comprises a mixture of glycerol monostearate and stearylamide-bis-triazinone-tetramethylol.

19. The shaped article as defined in claim 1 wherein said tetramethylol compound comprises stearyl-amino-bis-dimethylene-triazinone-tetramethylol.

20. The shaped article as defined in claim 1 wherein the secondary plasticizer is selected from the group consisting of glycerol, glycol and polyglycol.

21. The shaped article as defined in claim 1 which contains from about 0.5 to about 40% by weight of the plasticizing alkyl derivative relative to the amount of cellulose.

22. The shaped article as defined in claim 1 which comprises from about 5 to about 25% by weight of water.

23. The shaped article as defined in claim 1 wherein the synthetic polymer is a polyalkylene oxide obtained by addition polymerisation of alkylene oxides selected from the group consisting of ethylene oxide, propylene oxide and mixtures thereof wherein terminal $CH_2OH$ groups are converted into $-CH_2-O-CO-NH-CH_2-OH$ groups.

24. The shaped article as defined in claim 23 wherein the synthetic polymer is polyethylene glycol -1,000-di-(N-methylolcarbamate).

25. The shaped article as defined in claim 1, shaped as a film or a tube.

26. The shaped article as defined in claim 25 adapted for food packaging.

27. The shaped article as defined in claim 26 in form of a sausage casing.

28. The shaped article as defined in claim 27 which further comprises a water impermeable polymer coating on its inner side.

29. The shaped article as defined in claim 28 which further comprises a reinforcement of a fibrous material therein.

30. A process for preparing the shaped article comprising a plasticized chemically modified cellulose composition as defined in claim 1 which comprises the steps of:
(a) mixing a viscose containing solution and a liquid comprising at least one plasticizing alkyl derivative which comprises at least one alkyl containing from about 8 to about 24 carbon atoms and which is selected from the group consisting of alkylamido-bis-dimethylene-triazinone-tetramethylol, alkyl-amino- bis-dimethylene-triazinone-tetramethylol, a substantially water insoluble ester of an aliphatic monocarboxylic acid containing from about 9 to about 245 carbon atoms, and a polyalcohol comprising at least two hydroxy groups at least one of which is esterified with said aliphatic monocarboxylic acid, and mixtures thereof, to form a liquid mixture;
(b) introducing the liquid mixture through the shaping orifice of a die into a precipitating liquid to precipitate a shaped body comprising the hydrated cellulose in a gel state and a plasticity enhancing amount of said plasticizing alkyl derivative;
(c) washing the precipitated shaped body in the gel state;
(d) treating the washed shaped body in the gel state with an acidic aqueous solution containing at least one synthetic polymer containing recurring oxyalkylene groups and at least one terminal N-methylol carbamate group having the formula $$-CH_2-O-CO-NH-CH_2-OH$$

to incorporate into the shaped body a mechanical strength enhancing amount of the synthetic polymer, and
(e) heat treating the treated shaped body to obtain a dried shaped article comprising the plasticized chemically modified cellulose composition of high mechanical strength.

31. The process as defined in claim 30 wherein the acidic aqueous solution further comprises a water soluble plasticizer.

32. The process as defined in claim 30 which further comprises the step of adjusting the water content of the dried shaped article.

33. The process as defined in claim 30 which comprises adjusting the water content of the shaped article by moistening it with water.

34. The process as defined in claim 32 which comprises to impart to the shaped article, a water content of between about 4 and about 25% by weight.

35. The process as defined in claim 30 wherein the liquid comprises said ester.

36. The process as defined in claim 35 wherein the aliphatic monocarboxylic acid contains from about 9 to about 21 carbon atoms.

37. The process as defined in claim 35 wherein the ester is glycerol monostearate.

38. The process as defined in claim 35 wherein the ester is polyethylene glycol-1,000 monostearate.

39. The process as defined in claim 35 wherein the liquid comprises a mixture of glycerol monostearate and polyethylene glycol-1,000 monostearate in ratio of 1:1.

40. The process as defined in claim 30 wherein the liquid comprises stearylamido-bis-dimethylene-triazinone-tetramethylol.

41. The process as defined in claim 40 wherein the liquid comprises a mixture of glycerol monostearate and stearylamido-bis-triazinone-tetramethylol.

42. The process as defined in claim 30 wherein the liquid comprises stearylamino-bis-dimethylene-triazinono-tetramethylol.

43. The process as defined in claim 30 wherein the synthetic polymer is polyethylene glycol-1,000-di-(N-methylolcarbamate).

44. The process as defined in claim 43 wherein the liquid comprises glycerol monostearate and the acidic solution comprises polyethylene glycol-1,000 di-(N-methylolcarbamate), and glycerol.

45. The process as defined in claim 43 wherein the liquid comprises a mixture of glycerol monostearate and polyethylene glycol-1,000 monostearate in the ratio of 1:1 and the acidic solution comprises polyethylene glycol-1,000 di-(N-methylolcarbamate) and glycerol.

46. The process as defined in claim 30 wherein the synthetic polymer has a molecular weight of from about 200 to about 6000.

47. The process as defined in claim 30 wherein the shaped body is a tube-shaped body.

48. The process as defined in claim 47 which further comprises the step of applying the liquid mixture to a tube of a nonwoven fiber material.

49. The process as defined in claim 30 which further comprises the step of applying to a tube-shaped article an inner layer of a water vapor permeable polymer coating.

50. A method of preparing sausages which comprises the step of filling a sausage material into a tube-shaped article as defined in claim 27.

* * * * *